United States Patent [19]
Case et al.

[11] 4,058,428
[45] Nov. 15, 1977

[54] PIPE COATING MACHINE

[75] Inventors: Patrick P. Case; David L. Gardner, both of Conroe, Tex.

[73] Assignee: Compression Coat Corporation, Houston, Tex.

[21] Appl. No.: 439,322

[22] Filed: Feb. 4, 1974

[51] Int. Cl.² .................... B65H 81/08; F16L 9/16
[52] U.S. Cl. ............................... 156/429; 138/144; 138/175; 156/162; 156/187; 156/188; 156/431
[58] Field of Search ............... 156/171, 187, 188, 190, 156/192, 195, 276, 297, 428, 429, 430, 431, 392, 162, 53, 543; 138/146, 175, 176, 144, 150

[56] References Cited
U.S. PATENT DOCUMENTS

| | | | |
|---|---|---|---|
| 3,617,415 | 11/1971 | Hawerkamp | 156/192 |
| 3,706,615 | 12/1972 | Nishiyama et al. | 156/173 |
| 3,706,624 | 12/1972 | Rinker | 156/432 |
| 3,740,291 | 6/1973 | Mallard | 156/195 |
| 3,817,813 | 6/1974 | Keith et al. | 156/429 |

Primary Examiner—William A. Powell
Assistant Examiner—M. G. Wityshyn
Attorney, Agent, or Firm—Donald Gunn

[57] ABSTRACT

Pipe coating apparatus which incorporates means for rotating and advancing a pipe along a specified path and an applicator means for placing cementicious materials thereon. The slurry is applied by a mechanism having a top opening which receives cement therein, the opening directing cement to a reinforcing ply which is applied to the pipe. The reinforcing material is delivered through the applicator mechanism. The cement falls on the reinforcing material which normally has a mesh construction. The pipe is advanced and rotated simultaneously. The helical movement of the pipe draws the reinforcing mesh into a gap at the lower side of the pipe above a free rotating parallel roller. A ply of weatherproofing material such as plastic film is placed on the pipe.

6 Claims, 3 Drawing Figures

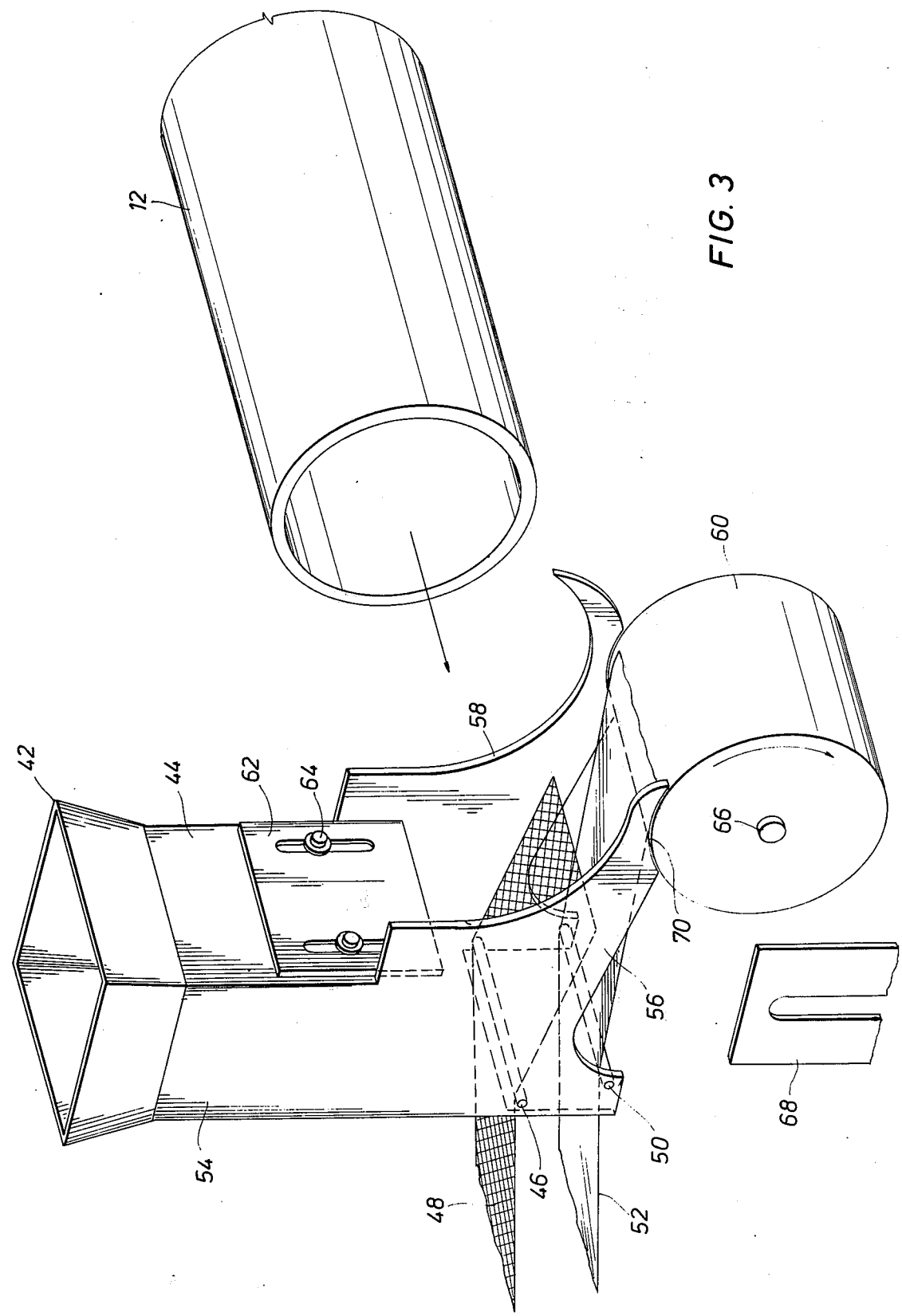

PIPE COATING MACHINE

BACKGROUND OF THE INVENTION

In laying pipelines, they must occasionally cross bodies of water. Weight material must be added to the exterior of the pipe to control the buoyancy of the pipe. Moreover, the weight material also provides exterior protection of the pipe after it has been placed in the water.

Various attempts have been made in the past to devise coating machines. This coating machine is believed to be superior to coating machines of the prior art in that it has a relatively simply mechanism for application of the coating material to the exterior surface of the pipe and is able to control the texture, consistency and surface smoothness of the coating.

The apparatus of the present invention thus is characterized as an improved version of equipment which applies a cement coating to sections of pipe. The apparatus is particularly distinguished in that a conveyor belt smooths and places the cement on the surface. Moreover, it provides application of cement to a specified thickness. In addition, wrapping materials, ordinarily two ply, are applied immediately after the cement has been compressed and compacted against the pipe.

SUMMARY OF THE PRESENT INVENTION

The present invention is summarized as pipe coating apparatus which places cement on sections of pipe by depositing on the pipe a coating of cement to a regulated thickness. The apparatus includes an elongate platform which receives and supports pipe thereon. The pipe is advanced along the platform and rotation is imparted. The cement is transferred on a conveyor belt and dropped through a vertical chute having sides which define the width of the cement applied to the pipe. The sides are spaced apart just above a path of travel of a reinforcing material mesh. The cement falls onto the mesh. The mesh is guided through the chute in a generally horizontal direction toward the pipe. The mesh travels generally horizontally, picking up the cementicious material and is wrapped around the pipe from the bottom. The mesh carries the cement toward the pipe as it is drawn by the rotating pipe. The protective film applied is below the mesh. The pipe travels above a free wheeling roller or drum. The drum controls the thickness of the coating. Excessive cement can escape the compressive pinch of the drum against the pipe only by flowing back toward the chute. The roller cooperates with the pipe to provide a uniform thickness of coating on the pipe. The roller compresses the cement.

DESCRIPTION OF THE PREFERRED EMBODIMENT

Figure 1:
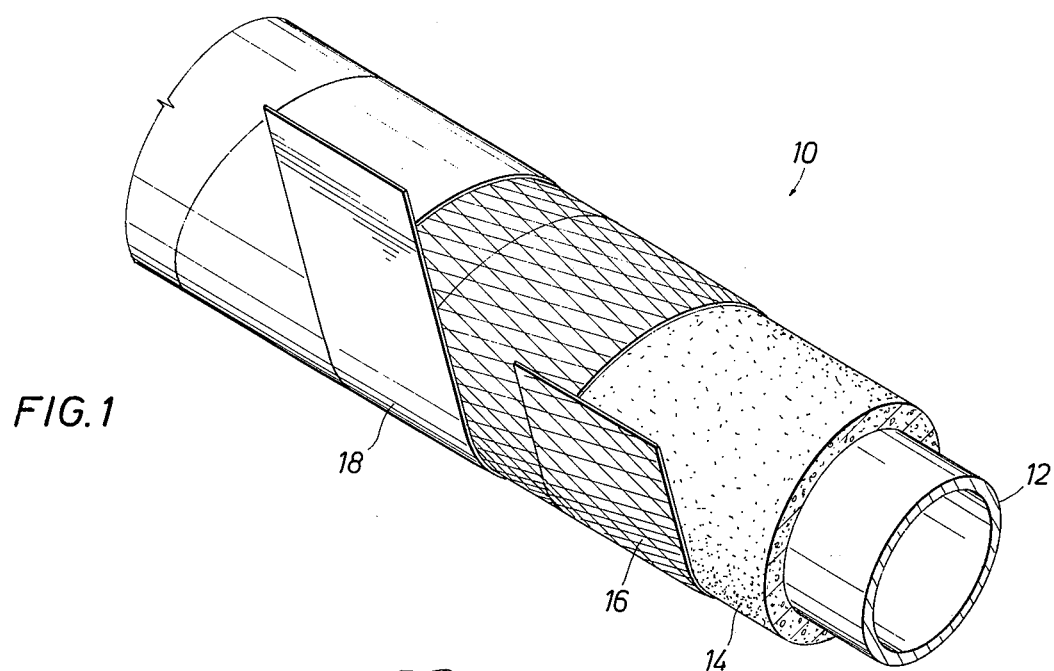
FIG. 1 shows a pipe coated in accordance with the present invention and illustrates separate plys which include a wire reinforcing mesh which is embedded into the cement and a wrap of protected film.

Attention is directed to FIG. 1 where the numeral 10 identifies a pipe formed in accordance with the present invention. The pipe incorporates a pipe section 12 which is of conventional construction and which is adapted to be placed in the pipeline. Pipe 12 is coated with cement which includes aggregates and binders and other additives such as waterproofing materials as required to form an external coating on the pipe. The coating is indicated by the numeral 14. It is applied to a density and thickness determined by the place of installation of the pipe 10. In other words, it aids in controlling buoyancy and to this extent, may be varied in thickness and density to obtain a desired density. Moreover, the coating material 14 is applied in a wet state, somewhat tacky, so that it will tend to cling to the pipe.

The present invention compresses the coating material 14 to regulate the density and applies a wrapping 16 of reinforcing mesh material. The wrapping 16 is wrapped in overlapping fashion along the length of the pipe. It will be appreciated that it is applied as a helix to the pipe. The wrapping 16 is preferably formed of reinforcing mesh. It imparts strength to the cement coating 14. As a generalization, cement does not have much strength in tension and the ply of reinforcing material imparts strength to the coating to prevent the coating from chipping or breaking away from the pipe. The reinforcing mesh 16 is applied in overlapping fashion against the wet cement and tends to embed somewhat into the cement. This tendency depends on the prior compression applied to the cement and its state of tackiness. Moreover, it also depends on the gauge of wires and the tension applied to the wrapping material 16 as it is placed on the pipe. The numeral 18 identifies an additional wrap or ply of film such as polyethylene film or the like. It is applied on the exterior and serves as a vapor barrier.

Figure 2:
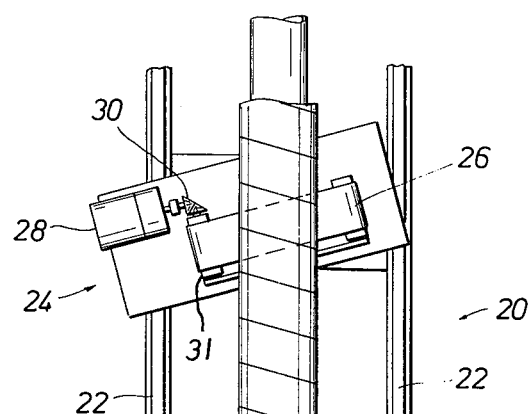
FIG. 2 is a plan view of a pipe coating apparatus in accordance with the present invention include means for advancing and rotating the pipe while cement is applied to the exterior surface; and, FIG. 3 is a perspective view showing details of construction of an applicator means.

The present invention is indicated by the numeral 20 in FIG. 2. It is an elongate structure which is adapted to receive and transport a section of pipe. To this end, a pair of side rails 22 extend along the length of the structure. They support first and second mechanisms for advancing the pipe. A first mechanism is indicated at 24. The pipe advance mechanism 24 includes a conveyor belt 26 which is positioned at an angle neither parallel nor transverse to the main axis of the pipe. The conveyor belt tends to rotate the pipe but also has a axial component of movement which causes the pipe to advance along the rails 22. The advancing mechanism 24 includes a drive motor 28, a set of bevel gears 30 connected to the shaft of the motor and a roller 31 rotated by the bevel gears. The roller 31 drives the conveyor belt 26 which passes over a similar roller. The rollers are rotated together by means of a chain drive or some other common connection so that they rotate in unison. If desired, the second roller may be an idler.

The numeral 32 identifies a second advancing mechanism. It also includes a drive motor and bevel gear arrangement. The bevels are attached to the shaft of the motor and rotate a wheel 34 which tangentially engages the pipe. A similar and matching wheel 36 is located on the opposite side of the pipe so that the wheels 34 and 36 together support the pipe axially arranged between the rails 22 and at a specified height. The wheels thus are preferably centered equally to the right and left of the pipe. Moreover, they provide a driving force to the pipe. The conveyor 26 provides a broad surface which contacts the pipe after the cement has been placed thereon. At this juncture, the coating material is somewhat soft and tacky and the conveyor 26 is preferably broad and does not provide the driving force for the pipe. By way of contrast, the wheels 34 and 36 contact the metal pipe itself and provide the driving force which moves the pipe axially along the mechanism and which also impart rotation. The rotation of the pipe is achieved by the canted arrangement of the wheels 34 and 36. In other words, they are offset somewhat from a transverse position to an angle which will approximate 75° or 80°.

The numeral 38 identifies transverse frame members between the rails 22 which extend the length of the equipment. Simple undriven pipe rollers preferably extend between the rails beyond the equipment illustrated to maintain the pipe in the generally horizontal position as it is advanced toward the coating applicator means. This is helpful inasmuch as pipe normally comes in sections of specified length. The pipe must be supported before it encounters the drive rollers 34 and 36. To this end, a rack beneath the pipe preferably made of freewheeling rollers will support the pipe and deliver it to the appropriate location for contact by the drive rollers. When the pipe is then contacted by the rollers 34 and 36, rotation is started. Rotation will be observed to be in proportion to linear translation. In other words, it advances at a regulated helical rate. In like manner, an additional axially arranged conveyor or other mechanism for acceptance of the pipe is preferably arranged beyond the conveyor belt 26. It need not impart rotation but merely moves the pipe axially away from the equipment so that an additional section of pipe can be coated.

Continuing with the description of FIG. 2, the numeral 40 identifies an overhead conveyor which carries cementicious material from a mixing mechanism to an applicator means which will be described. The conveyor 40 preferably runs continuously so long as the pipe is in the pipe coating apparatus.

Attention is next directed to FIG. 3 of the drawings which illustrates the apparatus which applies the coating material to the pipe. The pipe 12 is advanced and rotated simultaneously. The coating apparatus includes a funnel 42 which opens upwardly to receive cement from the conveyor 40. The funnel 42 opens into a generally rectangular chute formed of side walls. The width of the chute determines the width of coating applied on each pass. The chute is spanned by a guide pin 46 which guides or directs the reinforcing mesh 48 beneath the chute. A second guide pin 50 guides the protective ply 52. The pin 50 guides the ply 52 so that it spaced below the reinforcing mesh 48. This helps supply the two plys in coincident fashion. That is to say, they are preferably applied simultaneously and have parallel edges when wrapped. To this end, the guide pin 50 and the side walls of the chute serve as an alignment fixture aligning the protective ply 52 with the reinforcing mesh 48.

The chute includes a side wall 54 which has a lateral extension 56. The extension 56 is matched by the parallel side wall. The two side walls together prescribe an upwardly facing curve 58 which controls the position of the pipe relative to a free wheeling roller 60. The distance between the roller 60 and the pipe 12 determines the thickness of the coating to be applied. The curved edge 58 provides an absolute limit on the thickness of the coating. The pipe 12 can be lowered until it comes in contact with the curved edge 58. It can be raised above the curved edge. The curved edge accommodates pipe over a specified range of diameters. The curved edge 58 keeps the cement on the reinforcing mesh 48. To this extent, the mesh 48 spans approximately the full width of the chute 44 with only slight clearance at the sides. The cement normally accummulates in the center of the mesh and little is found at the edges when it passes beneath the funnel 42. As the mesh 48 approaches the pipe and is wrapped around the pipe in helical form, the accummulation of cement in the center of the mesh is flattened to a desired thickness. It is compressed on being pinched between the roller 60 and the pipe 12. It is forced against the pipe 12 and adheres to it. The cement may have an accummulation of bubbles when it is dropped through the funnel 42 onto the mesh. The compressive action of the pipe relative to the roller compresses bubbles from the cement and tends to flatten it across the width of the reinforcing mesh. One side of the strip of cement applied with the reinforcing mesh 48 abuts the adjacent helical turn and the cement flows against the previously applied turn to comingle and define a unitary structure.

The front wall of the chute 44 includes a movable plate 62 which is locked in position by means of lock bolts 64 and large washers. The bolts and washers secure the plate 62 at a specified height above the reinforcing mesh 48. If desired, the lower edge of the plate 62 serves as a scrapper which tends to even the height of the cement deposited on the reinforcing mesh. If a reduction in thickness of pipe coating is desired, the scrapper can be lowered. Conversely, it can be raised to apply a thicker coating. It serves as a regulator in the event that an excess of cement is dumped in the chute 44. It permits only a regulated flow of cement from the chute. The regulated flow obtained by the scrapper plate 62 enables the apparatus to accummulate excessive cement in the chute. This reduces the requirement of regulated cement flow at the mixing plant which is connected to the apparatus by the conveyor 40 shown in FIG. 2. This eliminates speed regulation problems in the apparatus.

The roller 60 is supported on a shaft for free wheeling rotation. It is supported by the rails 22 by means of appropriate upstanding mounting plates. The roller 60 has a shaft 66 which is adjustable in height relative to the mounting plate. One is shown at one end of the roller 60 in FIG. 3 and a similar or duplicate mounting plate or bracket is provided for the other end of roller 60. The shaft 66 is fixed by appropriate nuts and lock washers to the mounting plate 68. The shaft 66 need not rotate but rather supports the roller 60 by bearings which permit the roller 60 to rotate. The roller 60 may be any suitable diameter and does not have to match the diameter of the pipe. The axial length of the roller 60 preferably equals or exceeds the width of the mesh 48. The roller 60 flattens the cement carried on the mesh and controls the thickness of the coating applied to the pipe. The roller thus serves to finish and trowel the cement, so to speak. The roller forces the reinforcing mesh 48 into intimate contact with the cement. To the extent that cement does fall through the mesh 48, it is carried by the waterproofing ply 52. A minimum of cement does pass through the reinforcing mesh which can have a mesh small enough to hold the slurry on the top side. The free wheeling compression drum applies the two ply wrapping material to the cement with some overlap. This depends on the rate of feed and the helical set of the plys 48 and 52 relative to the path of the pipe 12.

The apparatus is able to apply a coating with more weight per cubic foot of concrete. This is achieved through the use of larger aggregates. Larger aggregates are more readily available and are cheaper. Larger aggregates can be used in this apparatus because they do not have to pass through any confined spaces and the compressive roller action achieved by the roller 60 does not permit the larger aggregate to damage the mesh 48.

The side plates 56 are curved at the lower edge 70 to conform with the circumference of the drum 60. Contact is not required. Some spacing between the two is desirable to avoid wear.

Many changes and alterations in the applicator described to this juncture may be incorporated. However, the scope of the present invention is determined by the claims which are appended hereto.

We claim:

1. An apparatus for applying a cementatious coating to a pipe on the exterior thereof, comprising:
    means for advancing a pipe to be coated along its axis, said means moving consecutive sections of pipe along a specified path;
    applicator means for applying a cementatious weight material to a pipe moving in a path determined and controlled by said pipe advancing means, said applicator means including a first means for holding and dispensing a supply of cementatious material;
    means for storing a supply of pipe wrapping material in the form of an elongate ribbon;
    means for guiding the elongate ribbon of pipe wrapping material through said applicator means;
    said applicator means further including a second means placing a layer of cementatious material from said first means on an exposed surface of the pipe wrapping material wherein the layer is on the surface thereof facing the pipe prior to application;
    third means for rotating the pipe as cementatious material and the pipe wrapping material are placed on the pipe by said applicator means, said third means continuously presenting to said applicator means an uncoated portion of the pipe;
    a rotatable drum having an outer cylindrical surface approximately parallel to the axis of the pipe and spaced therefrom; and
    said applicator means further including a fourth means which guides the pipe wrapping material after the exposed surface thereof has had a layer of the cementatious material coated thereon into the space between the pipe and said drum in a manner such that said drum, presses against the uncoated surface of the coated pipe wrapping material and squeezes the cementatious material into contact with the pipe, said drum controlling the thickness of the cementatious material applied to the pipe by squeezing the excess, if any, away from the pipe.

2. The pipe coating apparatus of claim 1 wherein said applicator means includes an upright hollow container for receiving a supply of cementatious material, said container including an opening in the upper portion thereof, and said container further includes an elongate slot for admitting the pipe wrapping material.

3. The apparatus of claim 1, wherein said applicator means includes an upper hollow portion for receiving a supply of cementatious material therein and is open across the bottom, and said guiding means includes a pair of spaced walls which guide the pipe wrapping material beneath the hollow portion to enable a supply of cementatious material to be received thereon and the pipe wrapping material emerges from the hollow portion through a wall which defines a portion of said applicator means and said last mentioned wall has an edge spaced from the path of the pipe wrapping materials which determines, at least in part, the thickness of the cementatious materials placed on the pipe wrapping material.

4. The apparatus of claim 1, wherein said rotatable drum is mounted on a shaft, which can be raised and lowered relative to the axis of the pipe to thereby vary the spacing between said drum and the pipe.

5. The apparatus of claim 1, wherein said applicator means incorporates a pair of spaced, side walls which define the width thereof and said walls capture therebetween a supply of cementatious material and which walls further guide the pipe wrapping material so that it receives the cementatious material and is guided to the space between the pipe and said drum and said walls extend adjacent to the path of the pipe wrapping material to support cementatious material on the pipe wrapping material and prevent loss of cementatious material along the sides of the pipe wrapping material.

6. The apparatus of claim 1, wherein a second pipe wrapping material is utilized and is spaced above the first pipe wrapping material and the two are supported in parallel fashion by transverse support members in said applicator means.

* * * * *